United States Patent [19]

Fukushima et al.

[11] Patent Number: 5,247,038
[45] Date of Patent: Sep. 21, 1993

[54] POLYBUTYLENE GLYCOL DIMETHACRYLATE AND RESIN COMPOSITION FOR CAST POLYMERIZATION

[75] Inventors: Hiroshi Fukushima; Akira Motonaga; Eriko Suda, all of Nagoya; Susumu Sugitani, Otake, all of Japan

[73] Assignee: Mitsubishi Rayon Co., Ltd., Tokyo, Japan

[21] Appl. No.: 892,652

[22] Filed: Jun. 3, 1992

Related U.S. Application Data

[63] Continuation of Ser. No. 619,493, Nov. 29, 1990, abandoned.

[30] Foreign Application Priority Data

| Nov. 29, 1989 | [JP] | Japan | 1-310240 |
| Jan. 19, 1990 | [JP] | Japan | 2-8322 |
| Feb. 28, 1990 | [JP] | Japan | 2-49034 |
| May 31, 1990 | [JP] | Japan | 2-142537 |

[51] Int. Cl.$^5$ ............................ C08F 236/20
[52] U.S. Cl. ............... 526/273; 526/266; 526/301; 526/312; 526/320; 526/321; 526/329.6; 526/333
[58] Field of Search .......... 526/273, 320, 321, 266

[56] References Cited

U.S. PATENT DOCUMENTS

| 3,947,401 | 3/1976 | Stamberger | 523/106 |
| 3,988,274 | 10/1976 | Masuhara | 523/106 |
| 4,129,524 | 12/1978 | Nagai | 526/192 |
| 4,143,017 | 3/1979 | Tarumi | 523/106 |
| 4,665,123 | 5/1987 | Goldenberg | 525/59 |
| 4,670,506 | 6/1987 | Goldenberg | 525/59 |
| 4,873,086 | 10/1989 | Good et al. | |
| 4,963,220 | 10/1990 | Bachmann | 156/307.3 |

FOREIGN PATENT DOCUMENTS 0301733 2/1989 European Pat. Off. .

OTHER PUBLICATIONS

Patent Abstracts of Japan, vol. 19, No. 172 (C-354) (2228) Jun. 18, 1986 & JP-A-61 021 119, Jan. 29, 1986.
Makromolekulare Chemie, Rapid Communications, vol. 2, No. 6/7, Aug. 1987, Heidelberg DE, pp. 427-437; Polytetrahydrofuran with Acrylate and Methacrylate Endgroups.
Chemical Patents Indec Basic Abstracts Journal, Section A, Week 8647, Jan. 21, 1987, A0414, Derwent Publ, Ltd., London, GB; & JP-1-61228007, Oct. 11, 1986.
Patent Abstracts of Japan, vol. 10, No. 172 (C-354) (2228) Jun. 18, 1986 & JP-A-61 021 119, Jan. 29, 1986.
Patent Abstracts of Japan, vol. 10, No. 366 (C-390) (2423) Dec. 6, 1986, & JP-A-61 162 511, Jul. 23, 1986.

*Primary Examiner*—Joseph L. Schofer
*Assistant Examiner*—Fred Zitomer
*Attorney, Agent, or Firm*—Oblon, Spivak, McClelland, Maier & Neustadt

[57] ABSTRACT

Disclosed herein is a polybutylene glycol dimethacrylate which provides various kinds of plastics having good flexibility and low water absorption. Disclosed also herein is a resin composition for cast polymerization which provides molded products which have high heat resistance, good flexibility, and low water absorption, without sacrificing impact resistance and surface hardness. They will find use as optical materials, lenses, etc.

16 Claims, No Drawings

POLYBUTYLENE GLYCOL DIMETHACRYLATE AND RESIN COMPOSITION FOR CAST POLYMERIZATION

This application is a continuation of application Ser. No. 07/619,493, filed on Nov. 29, 1990, now abandoned.

BACKGROUND OF THE INVENTION

1. Field of the Invention

The present invention relates to polybutylene glycol dimethacrylate and also to a resin composition for cast polymerization containing the same. More particularly, the present invention relates to polybutylene glycol dimethacrylate and also to a resin composition for cast polymerization containing the same, which are useful for the production of plastics having high heat resistance, good flexibility, and low water absorption.

2. Description of the Prior Art

At present, plastics find use in a variety of fields as molding materials, optical lenses, optical discs, electric and electronic parts, film, machine parts, and laminated glass. Plastics for these applications are required to have improved toughness, flexibility, and impact resistance. This requirement is met by incorporating polymer chains with polyether, polyurethane, polyester, or polycarbonate which has an elastic structure. The incorporation is carried out in the stage of monomer or oligomer prior to polymerization. There are application areas where plastics are required to be moisture-resistant. This requirement is met by incorporating polymer molecules with hydrocarbon chains, aromatic rings, halogen atoms, etc.

In the case where a polymer is produced by cast polymerization, it is desirable to use a monomer of low viscosity for good workability. This requirement is met when the polymer molecular chain has the polyether structure which is highly elastic. This polyether structure is imparted by polyethylene glycol di(meth)acrylate or polypropylene glycol di(meth)acrylate. The flexibility of polymer increases in proportion to the number of such repeating units as ethylene oxide and propylene oxide contained therein.

Although it is possible to lower the water absorption of a polymer by incorporating it with hydrocarbon chains, aromatic rings, or halogen atoms, the resulting polymer lacks flexibility. The requirement for flexibility is met by the above-mentioned polyethylene glycol di(meth)acrylate for cast polymerization which has the polyether structure. This polymer, however, has a water absorption as high as 10–20%.

SUMMARY OF THE INVENTION

The present invention was completed to eliminate the above-mentioned disadvantages. Accordingly, it is an object of the present invention to provide a new polybutylene glycol dimethacrylate which yields a molded product having both good flexibility and low water absorption.

It is another object of the present invention to provide a first resin composition for cast polymerization which yields a molded product having both good flexibility and low water absorption, without loss of impact resistance and surface hardness.

It is further another object of the present invention to provide a second resin composition for cast polymerization which yields a molded product having high heat resistance, good flexibility, and low water absorption.

The polybutylene glycol dimethacrylate pertaining to the present invention is represented by the general formula below.

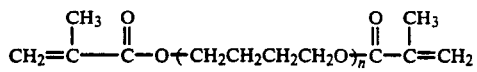

(where n is an integer of 5 to 16.)

The first resin composition for cast polymerization pertaining to the present invention is composed of:
(A) 10–90 parts by weight of polybutylene glycol dimethacrylate represented by the general formula below,

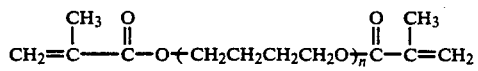

(where n is an integer of 5 to 16), and
(B) 10–90 parts by weight of a compound having at least one polymerizable double bond in the molecule, with the total amount of components (A) and (B) being 100 parts by weight.

The second resin composition for cast polymerization preparing to the present invention is composed of:
(a) 10–90 parts by weight of at least one compound selected from the group consisting of epoxy poly(meth)acrylate having two or more (meth)acryloyloxy groups in one molecule and urethane poly(meth)acrylate having two or more (meth)acryloyloxy groups in one molecule, and
(b) 10–90 parts by weight of polybutylene glycol di(meth)acrylate represented by the general formula below,

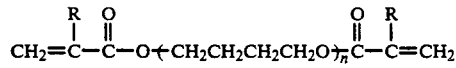

(where R represents hydrogen or methyl, n is an integer of 5 to 16)
with the total amount of components (a) and (b) being 100 parts by weight.

The above and other objects, features, and advantages of the present invention will become readily apparent from the following detailed description.

DESCRIPTION OF THE PREFERRED EMBODIMENTS

The polybutylene glycol dimethacrylate pertaining to the present invention is polybutylene glycol having a degree of polymerization in the range of 5 to 16, with its both terminals blocked with methacrylic acid. The degree of polymerization denotes the number of repeating units represented by the formula ($CH_2CH_2CH_2CH_2O$), and it should be in the range of 5 to 16 according to the present invention. With a degree of polymerization smaller than 5, it yields a polymer which lacks sufficient flexibility. With a degree of polymerization greater than 16, it yields a polymer which has a high water absorption and viscosity and a low crosslinking density and hardness and is poor in heat resistance and workability. The degree of polymerization should preferably be in the range 7 to 12. Needless to say, the polybutylene glycol dimethacrylate of the present invention is a mixture of species which differ in molecular-weight distribution.

The polybutylene glycol methacrylate pertaining to the present invention includes, for example, pentabutylene glycol dimethacrylate, hexabutylene glycol dimethacrylate, heptabutylene glycol dimethacrylate, octabutylene glycol dimethacrylate, nonabutylene glycol dimethacrylate, decabutylene glycol dimethacrylate, undecabutylene glycol dimethacrylate, dodecabutylene glycol dimethacrylate, tridecabutylene glycol dimethacrylate, tetradecabutylene glycol dimethacrylate, pentadecabutylene glycol dimethacrylate, and hexadecabutylene glycol dimethacrylate.

The polybutylene glycol dimethacrylate pertaining to the present invention can be easily produced by the condensation reaction between polybutylene glycol (which is obtained by the ring-opening polymerization of tetrahydrofuran) and methacrylic acid, or by the ester interchange reaction between polybutylene glycol and methyl methacrylate. Which to choose depends on the end use of the polymer. If the polymer is to be made into a transparent material, it is necessary to choose the ester interchange reaction which gives rise to a colorless transparent monomer.

According to the present invention, the resin composition for cast polymerization contains component (B) which imparts heat resistance and surface hardness to the resin composition. It may be any compound which has at least one polymerizable double bond in its molecule. It includes mono(meth)acrylates such as methyl (meth)acrylate, ethyl (meth)acrylate, propyl (meth)acrylate, n-butyl (meth)acrylate, i-butyl (meth)acrylate, t-butyl (meth)acrylate, pentyl (meth)acrylate, 2-ethylhexyl (meth)acrylate, n-hexyl (meth)acrylate, lauryl (meth)acrylate, stearyl (meth)acrylate, butoxyethyl (meth)acrylate, allyl (meth)acrylate, methallyl (meth)acrylate, glycidyl (meth)acrylate, N,N-dimethylaminoethyl (meth)acrylate, N,N-diethylaminoethyl (meth)acrylate, 2-cianoethyl (meth)acrylate, dibromopropyl (meth)acrylate, N-vinyl-2-pyrrolidone (meth)acrylate, polyethylene glycol monoalkylether (meth)acrylate, polypropylene glycol monoalkylether (meth)acrylate, 2-hydroxyethyl (meth)acrylate, 2-hydroxypropyl (meth)acrylate, 2-hydroxybutyl (meth)acrylate, 4-hydroxybutyl (meth)acrylate, tetrahydrofurfuryl (meth)acrylate, cyclopentyl (meth)acrylate, cyclohexyl (meth)acrylate, methylcyclohexyl (meth)acrylate, trimethylcyclohexyl (meth)acrylate, norbornyl (meth)acrylate, isobornyl (meth)acrylate, adamantyl (meth)acrylate, dicyclopentenyl (meth)acrylate, dicyclopentanyl (meth)acrylate, phosphoethyl (meth)acrylate, phenyl (meth)acrylate, benzyl (meth)acrylate, phenoxyethyl (meth)acrylate, phenoxypropyl (meth)acrylate, phenylglycidyl (meth)acrylate, phenylcellosolve (meth)acrylate, nonylphenoxyethyl (meth)acrylate, biphenyl (meth)acrylate, naphthyl (meth)acrylate, bromophenyl (meth)acrylate, tribromophenyl (meth)acrylate, pentabromophenyl (meth)acrylate, chlorobenzyl (meth)acrylate, bromobenzyl (meth)acrylate, tribromobenzyl (meth)acrylate, and 2-phenylphenol (meth)acrylate;

di(meth)acrylate of polyethylene glycol such as ethylene glycol di(meth)acrylate, diethylene glycol di(meth)acrylate, triethylene glycol di(meth)acrylate, tetraethylene glycol di(meth)acrylate, pentaethylene glycol di(meth)acrylate, and nonaethylene glycol di(meth)acrylate;

di(meth)acrylate of polypropylene glycol such as polypropylene glycol di(meth)acrylate, dipropylene glycol di(meth)acrylate, tripolypropylene glycol di(meth)acrylate, tetrapolypropylene glycol di(meth)acrylate, and nonapolypropylene glycol di(meth)acrylate;

polyfunctional (meth)acryl compounds such as 1,3-butylene glycol di(meth)acrylate, 1,4-butylene glycol di(meth)acrylate, 1,6-hexamethylene di(meth)acrylate, 1,14-tetradecamethylene di(meth)acrylate, neopentyl glycol di(meth)acrylate, neopentyl glycol hydroxypivalate di(meth)acrylate, di(meth)acrylate of caprolactone adduct of neopentyl glycol hydroxypivalate, neopentyl glycol di(meth)acrylate, dicyclopentenyl di(meth)acrylate, dicyclopentanyl di(meth)acrylate, 2-(2-hydroxy-1,1-dimethylethyl)-5-hydroxymethyl-5-ethyl-1,3-dioxane di(meth)acrylate, trimethylolpropane tri(meth)acrylate, ditrimethylolpropane tetra(meth)acrylate, pentaerythritol tri(meth)acrylate, dipentaerythritol penta(meth)acrylate, dipentaerythritol hexa(meth)acrylate, di(meth)acryloxyethylisocyanurate, tris(meth)acryloxyethyl isocyanurate, 2,2'-bis(4-(meth)acryloxyphenyl)-propane, 2,2'-bis(4-(meth)acryloxyethoxyphenyl)-propane, 2,2'-bis(4-(meth)acryloxydiethoxyphenyl)-propane, 2,2'-bis(4-(meth)acryloxypentaethoxyphenyl)-propane, 2,2'-bis(4-(meth)acryloxyethoxy-3,5-dibromophenyl)-propane, 2,2'-bis(4-(meth)acryloxydiethoxy-3,5-dibromophenyl)propane, 2,2'-bis(4-(meth)acryloxypentaethoxy-3,5-dibromophenyl)-propane, 2,2'-bis(4-(meth)acryloxyethoxy3,5-dimethylphenyl)-propane, 2,2'-bis(4-(meth)acryloxyethoxy-3-phenylphenyl)-propane, 2,2'-bis(4-(meth)acryloxyethoxyphenyl)-sulfone, 2,2'-bis(4-(meth)acryloxydiethoxyphenyl)-sulfone, 2,2'-bis(4-(meth)acryloxypentaethoxyphenyl)-sulfone, 2,2'-bis(4-(meth)acryloxyethoxy-3-phenylphenyl)-sulfone 2,2'-bis(4-(meth)acryloxyethoxy-3,5-dimethylphenyl)-sulfone, di((meth)acryloxyethoxy) phosphate, and tri((meth)acryloxyethoxy) phosphate; vinyl compounds such as styrene, vinyltoluene, chlorostyrene, bromostyrene, divinylbenzene, 1-vinylnaphthalene, 2-vinylnaphthalene, and N-vinylpyrrolidone; allyl compounds such as diethylene glycol bisallyl carbonate, trimethylolpropane diallyl, diallyl phthalate, dimethacryl phthalate, and allyl methacrylate; and metal salts of (meth)acrylic acid such as barium, lead, antimony, titanium, tin, and zinc (meth)acrylate.

These compounds may be used alone or in combination with one another.

According to the present invention, the resin composition for cast polymerization should be composed of 10–90 parts by weight of component (A) and 90–10 parts by weight of component (B). With component (A) less than 10 parts by weight, the resulting resin composition does not yield a polymer having sufficient flexibility and low water absorption. With component (A) in excess of 90 parts by weight, the resulting resin composition does not yield a polymer having sufficient heat resistance and surface hardness. The preferred amount of component (A) is 20–60 parts by weight.

According to the present invention, the resin composition for cast polymerization may be incorporated with additives such as antioxidant, antiyellowing agent, UV light absorber, bluing agent, and pigment, in an amount not harmful to the effect of the present invention, if necessary.

According to the present invention, the resin composition for cast polymerization can be readily produced by mixing the above-mentioned components (A) and (B) and optional additives in the usual way.

According to the present invention, the resin composition for cast polymerization may be used in various fields after curing in a proper way selected for the individual usage. Curing is accomplished by the aid of a polymerization initiator which includes organic peroxides (such as benzoyl peroxide, t-butyl peroxyisobutyrate, and t-butyl peroxy-2-ethylhexanoate), azo compounds (such as 2,2'-azobisisobutyronitrile, and 2,2'-azobis(2,4-dimethylvaleronitrile), and photopolymerization initiators (such as 2-hydroxy-2-methyl-1-phenylpropan-1-one, methylphenyl glyoxilate, and 2,4,6-trimethylbenzoyldiphenylsulfonoxide. These polymerization initiators may be used alone or in combination with one another. They may be used in an amount of 0.005-5 parts by weight for 100 parts by weight of the total amount of components (A) and (B). Curing may be accomplished by casting the resin composition, which has been incorporated with a polymerization initiator, into a mold cavity through a gasket, and subsequently heating the mold or irradiating the mold (one side or both sides) with active energy rays. Heating and irradiation may be used together. The mold may be composed of two mold halves, each made of glass, plastics, or metal, if the resin composition is to be made into optical lenses, laminated glass, optical discs, or film. After polymerization and curing, the casting may be demolded or used without demolding (as in the case of laminated glass).

The thus produced castings will find use as optical lenses, optical discs, electric and electronic parts, films, machine parts, and laminated glass. They are most suitable for optical lenses, optical discs, laminated glass, and films on account of their good flexibility and low water absorption.

The present invention covers another resin composition for casing. It is composed of component (a) and component (b). Component (a) is at least one compound selected from the group consisting of urethane poly(meth)acrylate having two or more (meth)acryloyloxy groups in one molecule and epoxy poly(meth)acrylate having two or more (meth)acryloyloxy groups in one molecule. The urethane poly(meth)acrylate includes those products which are formed by reaction between a hydroxyl group-containing (meth)acrylate and an isocyanate compound having at least two isocyanate groups in the molecule. Component (a) enhances the heat resistance imparted by component (b) which is polybutylene glycol di(meth)acrylate.

Examples of the isocyanate compound having at least two isocyanate groups in the molecule include aliphatic, aromatic, and alicyclic isocyanates such as tetramethylene diisocyanate, hexamethylene diisocyanate, 2,2,4-trimethylhexamethylene diisocyanate, dimer acid diisocyanate, cyclohexane diisocyanate, isophorone diisocyanate, tolylene diisocyanate, xylylene diisocyanate, 1,3-bis($\alpha,\alpha$-dimethylisocyanatemethyl)benzene, diphenylmethane diisocyanate, m-phenylene diisocyanate, dicyclohexylmethane diisocyanate, naphthalene diisocyanate, and biphenyl diisocyanate. Additional examples of the isocyanate compound include those compounds having at least two isocyanate groups in the molecule, which are formed by the reaction of one of said isocyanates with a compound having at least two active hydrogen atoms in the form of amino group, hydroxyl group, carboxyl group, or water. The above-mentioned diisocyanate compounds may be used in the form of trimer, tetramer, or pentamer.

The hydroxyl group-containing (meth)acrylate to be reacted with a polyisocyanate includes hydroxyl group-containing (meth)acrylate (such as 2-hydroxyethyl (meth)acrylate, 2-hydroxypropyl (meth)acrylate, 2-hydroxybutyl (meth)acrylate, and 4-hydroxybutyl (meth)acrylate); products formed by addition reaction between a monoepoxy compound and (meth)acrylic acid (such as butyl glycidyl ether, 2-ethylhexyl glycidyl ether, phenyl glycidyl ether, and glycidyl methacrylate); mono(meth)acrylic ester with polyethylene glycol or polypropylene glycol; and mono(meth)acrylic ester with polycaprolactone diol (n=1-5).

The addition reaction between polyisocyanate and hydroxyl group-containing (meth)acrylate may be accomplished by any known process which consists of adding dropwise a mixture of hydroxyl group-containing (meth)acrylate and a catalyst (such as di-n-butyl tin dilaurate) to an isocyanate compound at 50°-90° C.

The urethane poly(meth)acrylates may be used individually or in combination with one another. Those which are preferable from the standpoint of clarity and heat resistance of cast products are adducts of 2-hydroxyethyl (meth)acrylate or 2-hydroxypropyl (meth)acrylate with isophorone diisocyanate, trimer of hexamethylene diisocyanate, 2,2,4-trimethylhexamethylene diisocyanate, dicyclohexylmethane diisocyanate, 1,3-bis-($\alpha,\alpha$-dimethylisocyanatemethyl)benzene, or xylylene diisocyanate.

Another member of component (a), which is epoxy poly(meth)acrylate, is a product formed by the ring-opening reaction of glycidyl group which takes place between an epoxy compound having two or more glycidyl groups in the molecule and a compound (such as acrylic acid and methacrylic acid) having a (meth)acryloyl group and a carboxylic acid in the molecule. This component enhances the heat resistance imparted by component (b) which is polybutylene glycol di(meth)acrylate.

The epoxy compound having at least two glycidyl groups in the molecule includes the following. Aliphatic and alicyclic epoxy compounds such as 1,6-hexanediol diglycidyl ether, ethylene glycol diglycidyl ether, diethylene glycol diglycidyl ether, tetraethylene glycol diglycidyl ether, nonaethylene glycol diglycidyl ether, propylene glycol diglycidyl ether, dipropylene glycol diglycidyl ether, tetrapropylene glycol diglycidyl ether, nonapropylene glycol diglycidyl ether, neopentyl glycol diglycidyl ether, diglycidyl ether of neopentyl glycol hydroxypivalate ester, trimethylolpropane diglycidyl ether, trimethylolpropane triglycidyl ether, glycerol diglycidyl ether, glycerol triglycidyl ether, diglycerol diglycidyl ether, diglycerol triglycidyl ether, pentaerythritol diglycidyl ether, pentaerythritol triglycidyl ether, pentaerythritol tetraglycidyl ether, sorbitol tetraglycidyl ether, diglycidyl ether of tris(2-hydroxyethyl)isocyanurate, triglycidyl ether of tris(2-hydroxyethyl)isocyanurate, and 2,2-bis(4-glycidyloxycyclohexyl)propane.

Aromatic epoxy compounds such as resorcin diglycidyl ether, bisphenol A diglycidyl ether, bisphenol F diglycidyl ether, bisphenol S diglycidyl ether (which are obtained by condensation of epichlorohydrin with bisphenol A, bisphenol F, and bisphenol S, respectively), tetrabromobisphenol A diglycidyl ether, orthophthalic acid diglycidyl ether, phenolnovolak polyglycidyl ether, and cresolnovolak polyglycidyl ether.

The compound (such as acrylic acid and methacrylic acid) having a (meth)acryloyl group and a carboxylic acid in the molecule, which is to be reacted with one of the above-mentioned epoxy groups, includes acrylic acid, methacrylic acid, carboxylic acid-containing (meth)acrylate (which is obtained by reaction between hydroxyethyl (meth)acrylate and an acid anhydride such as o-phthalic anhydride), and carboxylic acid-containing (meth)acrylate (which is obtained by reaction between glycidyl (meth)acrylate and a compound (such as adipic acid) which has two or more carboxyl groups in the molecule.

The reaction between the epoxy compound and the carboxylic acid-containing (meth)acrylate may be accomplished by heating at 60°-110° C. in the presence of a catalyst, e.g., a tertiary amino compound (such as dimethylaminoethyl methacrylate) and a quaternary amine salt (such as benzyltrimethylammonium chloride).

The epoxy poly(meth)acrylates may be used alone or in combination with one another. Those which are preferable from the standpoint of clarity and heat resistance of cast products are reaction products of acrylic acid or methacrylic acid with 1,6-hexanediol diglycidyl ether, diethylene glycol diglycidyl ether, trimethylolpropane diglycidyl ether, trimethylolpropane triglycidyl, glycerol diglycidyl ether, glycerol triglycidyl, triglycidyl of tris(2-hydroxyethyl)isocyanurate, 2,2-bis(4-glycidyloxyhexyl)propane, bisphenol A diglycidyl ether, bisphenol S diglycidyl ether, and tetrabromobisphenol A diglycidyl ether.

According to the present invention, the second resin composition for cast polymerization contains component (b) which is polybutylene glycol di(meth)acrylate. This compound is polybutylene glycol having a degree of polymerization in the range of 5 to 16, with its both terminals blocked with acrylic acid or methacrylic acid. The degree of polymerization denotes the number (n) of the repeating units represented by the formula $(CH_2CH_2CH_2CH_2O)_n$. With the value of n smaller than 5, the resin composition yields a cast product which lacks sufficient flexibility. With the value of n greater than 16, the resin composition has such a high viscosity as to deteriorate workability and yields a cast product which has a high water absorption and a low crosslink density and hardness and is poor in heat resistance. The preferred degree of polymerization ranges from 7 to 12. The value n denotes the center value because the polybutylene glycol dimethacrylate is a mixture of species which differ in molecular-weight distribution.

The polybutylene glycol di(meth)acrylate used in the present invention can be easily produced by the condensation reaction between polybutylene glycol (which is obtained by the ring-opening polymerization of tetrahydrofuran) and acrylic acid or methacrylic acid, or by the ester interchange reaction between polybutylene glycol and methyl methacrylate or ethyl methacrylate. Which to choose depends on the end use of the polymer. If the polymer is to be made into a transparent material, it is necessary to choose the ester interchange reaction which gives rise to a colorless transparent monomer.

According to the present invention, the second resin composition for cast polymerization should be composed of 10-90 parts by weight of component (a) and 90-10 parts by weight of component (b), with the total amount of components (a) and (b) being 100 parts by weight. With component (a) less than 10 parts by weight, the resulting resin composition yields a polymer lacking sufficient heat resistance. With component (a) in excess of 90 parts by weight, the resin composition has such a high viscosity that it is poor in workability. The preferred amount of component (a) is 20-70 parts by weight. With component (b) less than 10 parts by weight, the resin composition yields a polymer lacking sufficient flexibility but having high water absorption. With component (b) in excess of 90 parts by weight, the resin composition yields a polymer lacking sufficient heat resistance and surface hardness. The preferred amount of component (b) is 20-60 parts by weight.

According to the present invention, the second resin composition for cast polymerization should preferably be incorporated further with a compound having at least one polymerizable double bond in the molecule. This compound imparts heat resistance and surface hardness and lowers viscosity. It is desirable that the resin composition have a low viscosity for the ease of casting operation, because it contains highly viscous urethane poly(meth)acrylate and/or epoxy poly(meth)acrylate. The compound should preferably be a low-viscosity ester monomer, whose examples include those compounds listed above as component (B) of the first resin composition for cast polymerization pertaining to the present invention.

According to the present invention, the second resin composition for cast polymerization may be incorporated with additives such as antioxidant, antiyellowing agent, UV light absorber, bluing agent, and pigment, in an amount not harmful to the effect of the present invention, if necessary.

According to the present invention, the second resin composition for cast polymerization can be readily produced by mixing the above-mentioned components (a) and (b) and optional additives in the usual way.

According to the present invention, the second resin composition for cast polymerization may be used in various fields after curing in a proper way selected for the individual usage. Curing is accomplished by the aid of a polymerization initiator which includes organic peroxides (such as benzoyl peroxide, t-butyl peroxyisobutyrate, and t-butyl peroxy-2-ethylhexanoate), azo compounds (such as 2,2'-azobisisobutyronitrile, and 2,2'-azobis(2,4-dimethylvaleronitrile), and photopolymerization initiators (such as 2-hydroxy-2-methyl-1-phenylpropan-1-one, methylphenyl glyoxilate, and 2,4,6-trimethylbenzoyldiphenylsulfonoxide.

These polymerization initiators may be used alone or in combination with one another. They may be used in an amount of 0.005-5 parts by weight for 100 parts by weight of the total amount of components (a) and (b). Curing may be accomplished by casting the resin composition, which has been incorporated with a polymerization initiator, into a mold cavity through a gasket, and subsequently heating the mold or irradiating the mold (one side or both sides) with active energy rays. Heating and irradiation may be used together. The mold may be composed of two mold halves, each made of glass, plastics, or metal, if the resin composition is to be made into optical lenses, laminated glass, optical discs, or film. After polymerization and curing, the casting may be demolded or used without demolding (as in the case of laminated glass).

The thus produced castings will find use as optical lenses, optical discs, electric and electronic parts, films, machine parts, and laminated glass. They are most suitable for optical lenses, optical discs, laminated glass, and films on account of their good flexibility and low water absorption.

EXAMPLES

The present invention will be described in more detail with reference to the following examples and comparative examples. Monomers used in the examples are abbreviated as follows:

- 9BGDM: nonbutylene glycol dimethacrylate
- 12BGDM: dodecabutylene glycol dimethacrylate
- 9BGDA: nonabutylene glycol diacrylate
- UA1: urethane triacrylate formed by reaction between hexamethylene diisocyanate trimer and 2-hydroxyethyl acrylate
- UA2: urethane dimethacrylate formed by reaction between dicyclohexylmethane diisocyanate and 2-hydroxypropyl methacrylate
- EA1: epoxy dimethacrylate formed by reaction between bisphenol A diglycidyl ether and methacrylic acid
- EA2: epoxy dimethacrylate formed by reaction between tetrabromobisphenol A diglycidyl ether and acrylic acid
- EA3: epoxy dimethacrylate formed by reaction between 2,2-(4-glycidyloxycyclohexyl)propane and methacrylic acid
- BP2EA: 2,2'-bis(4-acryloxydiethoxyphenyl)-propane
- HDDM: 1,6-hexamethylene dimethacrylate
- TMPM: trimethylolpropane trimethacrylate
- MMA: methyl methacrylate
- St: styrene
- 2GDM: diethylene glycol dimethacrylate
- n-BMA: n-butyl methacrylate
- 9EGDM: nonaethylene glycol dimethacrylate
- 9EGDA: nonaethylene glycol diacrylate
- 9PGDM: nonapropylene glycol dimethacrylate
- 14EGDM: tetradecaethylene glycol dimethacrylate
- 14EGDA: tetradecaethylene glycol diacrylate

EXAMPLE 1

(Synthesis of 9BGDM by ester interchange)

In a 5-liter four-neck flask were placed 2.0 kg of nonabutylene glycol (having an average molecular weight of 680, PTG-650SN, a product of Hodogaya Kagaku Co., Ltd.), 2.0 kg of MMA, 0.5 g of hydroquinone monomethyl ether, and 50 g of titanium tetrabutyl-n-butoxide (as a catalyst). Reaction was carried out for 3 hours by stirring the reactants at 100°-120° C., while slowly removing methanol (formed by the reaction) together with MMA by azeotropic distillation. After the reaction, excess MMA was distilled away under reduced pressure. To the residue was added 1 kg of toluene and the toluene solution was washed with alkaline water and finally freed of toluene by vacuum distillation. Thus there was obtained 9BGDM, which was colorless transparent and 100% pure according to the bromine addition purity test.

EXAMPLE 2

(Synthesis of 12BGDM by condensation reaction)

In a 5-liter four-neck flask were placed 2.0 kg of dodecabutylene glycol (having an average molecular weight of 890, PTG-850SN, a product of Hodogaya Kagaku Co., Ltd.), 1.5 kg of toluene, 0.6 kg of methacrylic acid, 1 g of hydroquinone, and 50 g of sulfuric acid. Reaction was carried out for 4 hours by stirring the reactants at 120° C., while removing water (formed by the reaction) together with toluene by azeotropic distillation. After the reaction, 1 kg of toluene was added, and the toluene solution was washed with alkaline water and finally freed of toluene by vacuum distillation. Thus there was obtained 12BGDM, which was slightly yellowish transparent and 98% pure according to the bromine addition purity test.

EXAMPLES 3 TO 8

The resin composition pertaining to the present invention was prepared from components (A) and (B) shown in Table 1 and 0.02 g of 2,2'-azobis(2,4-dimethylvaleronitrile) by mixing at room temperature. The resin composition was cast into a mold made up of two tempered glass plates (each measuring 100 mm square and 5 mm thick) and a gasket of PVC tube (6 mm in outside diameter for 2 mm thick plate or 10 mm in outside diameter for 5 mm thick plate). The cast resin composition was cured by heating at 80° C. for 3 hours and further heating at 120° C. for 3 hours. After demolding, the cured product was annealed at 100° C. for 1 hour to remove internal strains. The thus obtained plate was tested for physical properties in the following manner. The results are shown in Table 1.

- Light transmission (%): Measured according to ASTM D1003-61.
- Elongation by flexure (%): Measured according to ASTM D790-71.
- Water absorption at saturation (wt. %): The weight gain of a discoid specimen (75 mm in diameter and 5 mm thick) was measured after standing in a saturated steam bath at 70° C. for 3 days.
- State after water absorption test: After water absorption test the plate specimen was visually examined for appearance.
- Ball drop test: The 2-mm thick plate specimen was tested according to the FDA standards. The result is indicated in terms of the maximum weight of the steel ball which broke the specimen when dropped at a height of 127 cm.

COMPARATIVE EXAMPLES 1 TO 8

Molded products for comparison were prepared and evaluated in the same manner as in Example 3 to 8, except that the combination of components (A) and (B) was changed as shown in Table 1. The results are shown in Table 1.

EXAMPLE 9

(molding of film)

The resin composition pertaining to the present invention was prepared from components (A) and (B) shown in Table 1 and 0.1 g of 2,2'-azobis(2,4-dimethylvaleronitrile) by thorough mixing. The resin composition was cast onto a tempered glass plate (measuring 200 mm square and 5 mm thick) provided with a peripheral gasket of polyester film (200 μm thick and 10 mm wide). The cast resin composition was covered with a piece of polyester film (200 μm thick) to prevent the entrance of air bubbles. On the polyester film was placed a second tempered glass plate of the same size as mentioned above. The cast resin composition was cured by heating at 80° C. for 1 hour and further heating at 120° C. for 3 hours. After removal from the glass plate and polyester film, the cured product was tested for physical properties in the same manner as in Examples 3 to 8. The results are shown in Table 1. The cured product was also tested for tensile strength according to JIS K-7113. (The test piece cut from the film conforms to the standard for No. 2 test piece.) The specimen gave an elongation at break of about 50%.

COMPARATIVE EXAMPLE 9

A film for comparison was prepared and evaluated in the same manner as in Example 9, except that component (A) was not used and MMA alone was used as component (B) as shown in Table 1. The results are shown in Table 1. The specimen gave an elongation at break of about 4%.

EXAMPLE 10

(molding of laminated glass)

The resin composition pertaining to the present invention was prepared from components (A) and (B) shown in Table 1 and 0.5 g of t-butylperoxy-2-ethylhexanoate and 1 g of γ-mercaptopropyltrimethoxysilane by mixing at room temperature. The resin composition was cast into a mold made up of two soda glass plates (each measuring 300 mm square and 3 mm thick) and a butyl rubber seal. The cast resin composition was cured at room temperature for 5 hours and subsequent heating at 50° C. for 5 hours. The thus obtained laminated glass was evaluated in the same manner as in Example 3 to 8. The results are shown in Table 1. It is noted that the laminated glass is optically uniform and has good impact resistance.

COMPARATIVE EXAMPLE 10

A laminated glass for comparison was prepared and evaluated in the same manner as in Example 10, except that the monomers were used as shown in Table 1. The results are shown in Table 1.

This laminated glass gave 100 g in the ball drop test; however, it suffered delamination between the glass plate and the resin layer after the moisture resistance test.

Synthesis Example 1

(Synthesis of urethane triacrylate)

In a three-neck flask were placed 200 parts of hexamethylene diisocyanate trimer ("Sumidule N3200", a product of Sumitomo Bayer Urethane Co., Ltd.) and 0.2 part of hydroquinone monomethyl ether. To the flask was added dropwise a mixture of 140 parts of 2-hydroxyethyl acrylate and 0.2 part of n-butyl tin laurate over 3 hours with stirring and heating at 60° C. Reaction was continued for 3 hours at 70° C. Thus there was obtained urethane triacrylate.

Synthesis Example 2

(Synthesis of urethane dimethacrylate)

In a three-neck flask were placed 258 parts of dicyclomethane diisocyanate and 0.3 part of hydroquinone monomethyl ether. To the flask was added dropwise a mixture of 302 parts of 2-hydroxypropyl methacrylate and 0.3 part of n-butyl tin laurate over 3 hours with stirring and heating at 60° C. Reaction was continued for 3 hours at 70° C. Thus there was obtained urethane dimethacrylate.

EXAMPLES 11 TO 18

The resin composition pertaining to the present invention was prepared from components (a), (b) and (c) shown in Table 2 and 0.02 g of 2,2'-azobis(2,4-dimethylvaleronitrile) by mixing at room temperature. The resin composition was cast into a mold made up of two tempered glass plates (each measuring 100 mm square and 5 mm thick) and a gasket of PVC tube (6 mm in outside diameter for 2 mm thick plate or 10 mm in outside diameter for 5 mm thick plate). The cast resin composition was cured by heating at 80° C. for 3 hours and further heating at 120° C. for 3 hours. After demolding, the cured product was annealed at 100° C. for 1 hour to

TABLE 1

|  | (A) component (g) | (B) component (g) | light transmission (%) | elongation by flexure* (%) | water absorption at saturation (weight %) | state after water absorption | ball drop test (%) |
| --- | --- | --- | --- | --- | --- | --- | --- |
| example 3 | 9BGDM (30) | MMA (70) | 92 | 8.0 | 1.2 | changeless | 22 |
| example 4 | 12BGDM (30) | MMA (70) | 89 | 9.0 | 1.3 | changeless | 22 |
| example 5 | 9BGDM (10) | MMA (90) | 92 | 5.0 | 1.5 | changeless | 16 |
| example 6 | 9BGDM (50) | MMA (50) | 91 | 15.0 | 1.1 | changeless | 24 |
| example 7 | 9BGDM (70) | HDDM (30) | 90 | 25.0 | 1.1 | changeless | 32 |
| example 8 | 9BGDM (30) | St (70) | 91 | 10.0 | 0.4 | changeless | 32 |
| example 9 | 9BGDM (80) | 2GDM (20) | 92 | (50) | 1.2 | changeless | — |
| example 10 | 9BGDM (90) | BMA (10) | 89 | — | 0.01 | changeless | 150 |
| comparative example 1 | — | MMA (100) | 92 | 3.0 | 2.2 | changeless | 10 |
| comparative example 2 | 9BGDA (30) | MMA (70) | 90 | 8.5 | 1.7 | impurity | 22 |
| comparative example 3 | 9EGDM (30) | MMA (70) | 88 | 9.0 | 4.2 | little impurity | 16 |
| comparative example 4 | 9EGDA (30) | MMA (70) | 89 | 9.5 | 5.0 | little impurity | 16 |
| comparative example 5 | 9PGDM (30) | MMA (70) | 85 | 7.5 | 3.5 | little impurity | 10 |
| comparative example 6 | 14EGDM (30) | MMA (70) | 89 | 10.0 | 6.8 | impurity | 24 |
| comparative example 7 | 14EGDA (30) | MMA (70) | 90 | 11.0 | 7.2 | impurity | 24 |
| comparative example 8 | 9BGDM (100) | 0 | 91 | 100 | 1.0 | changeless | 50 |
| comparative example 9 | — | MMA (100) | 92 | (4) | 2.2 | changeless | — |
| comparative example 10 | — | MMA (30) BMA (70) | 89 | — | 0.05 | changeless | 100 |

*(%) represents value of elongation of tensile.

remove internal strains. The thus obtained plate was tested for physical properties in the same manner as in Examples 3 to 10. The results are shown in Table 2.

COMPARATIVE EXAMPLES 11 TO 21

Molded products for comparison were prepared and evaluated in the same manner as in Example 11 to 18, except that the combination of components (a) and (b) was changed as shown in Table 2. The results are shown in Table 2.

EXAMPLES 19 TO 26

The resin composition pertaining to the present invention was prepared from components (a), (b) and (c) as shown in Table 3 and 0.02 g of 2,2'-azobis(2,4-dimethylvaleronitrile) by mixing at room temperature. The resin composition was cast into a mold made up of two tempered glass plates (each measuring 100 mm square and 5 mm thick) and a gasket of PVC tube (6 mm in outside diameter for 2 mm thick plate or 10 mm in out-

TABLE 2

| | a component (g) | b component (g) | c component (g) | light transmission (%) | water absorption at saturation (%) | ball drop test (g) | Rockwell hardness (M) | heat resistance (Tg, °C.) |
| --- | --- | --- | --- | --- | --- | --- | --- | --- |
| example 11 | UA1 70 | 9BGDM 30 | — | 92 | 1.5 | 24 | 95 | 105 |
| example 12 | UA1 50 | 9BGDM 50 | — | 92 | 1.2 | 32 | 85 | 100 |
| example 13 | UA1 30 | 9BGDM 70 | — | 92 | 1.1 | 50 | 72 | 85 |
| example 14 | UA2 80 | 9BGDM 15 | MMA 5 | 91 | 1.3 | 24 | 102 | 117 |
| example 15 | UA2 60 | 9BGDM 30 | BP2EA 10 | 90 | 1.4 | 28 | 97 | 110 |
| example 16 | UA2 40 | 12BGDM 40 | HDDM 20 | 91 | 1.2 | 32 | 89 | 105 |
| example 17 | UA2 20 | 9BGDM 70 | TMPM 10 | 90 | 1.1 | 50 | 78 | 98 |
| example 18 | UA2 40 | 9BGDM 40 | HDDM 20 | 90 | 1.3 | 35 | 85 | 101 |
| comparative example 11 | — | — | MMA 100 | 92 | 2.2 | 10 | 90 | 80 |
| comparative example 12 | UA1 100 | — | — | 91 | 2.4 | 12 | 110 | 130 |
| comparative example 13 | UA2 80 | — | MMA 20 | 92 | 2.2 | 12 | 105 | 108 |
| comparative example 14 | UA2 40 | — | HDDM 60 | 90 | 1.5 | 8 | 100 | 115 |
| comparative example 15 | — | 9BGDM 70 | HDDM 30 | 91 | 1.1 | 32 | 40 | 58 |
| comparative example 16 | — | 9BGDM 30 | MMA 70 | 92 | 1.5 | 22 | 50 | 70 |
| comparative example 17 | — | 9BGDA 30 | MMA 70 | 90 | 1.7 | 22 | 45 | 50 |
| comparative example 18 | UA1 5 | 9BGDM 95 | — | 91 | 1.1 | 100 | 48 | 60 |
| comparative example 19 | UA1 50 | [9EGDM] 50 | — | 89 | 3.7 | 24 | 70 | 101 |
| comparative example 20 | UA1 50 | [9PGDM] 50 | — | 87 | 3.4 | 16 | 75 | 105 |
| comparative example 21 | UA1 50 | [14EGDA] 50 | — | 88 | 4.5 | 28 | 55 | 82 |

Synthesis Example 3

(Synthesis of epoxy dimethacrylate)

In a 5-liter three-neck flask were placed 3015 g of bisphenol A diglycidyl ether ("YD-8125", a product of Toto Kasei Co., Ltd.), 1485 g of methacrylic acid ("Methacrylic acid", a product of Mitsubishi Rayon Co., Ltd.), 45 g of benzyltrimethylammonium chloride (as a catalyst), and 1 g of hydroquinone monomethyl ether (as an inhibitor). Reaction was carried out at 70° C. for 3 hours, at 80° C. for 3 hours, and at 110° C. for 8 hours. Reaction was suspended when the acid value of the reaction product reached 0.15. Thus there was obtained epoxy dimethacrylate (EA1).

side diameter for 5 mm thick plate). The cast resin composition was cured by heating at 80° C. for 3 hours and further heating at 120° C. for 3 hours. After demolding, the cured product was annealed at 00° C. for 1 hour to remove internal strains. The thus obtained plate was tested for physical properties in the same manner as in Examples 3 to 10. The results are shown in Table 3.

COMPARATIVE EXAMPLES 22 TO 31

Molded products for comparison were prepared and evaluated in the same manner as in Example 19 to 26, except that the combination of components (a), (b) and (c) was changed as shown in Table 3. The results are shown in Table 3.

TABLE 3

| | (a) component (g) | (b) component (g) | (c) component (g) | light transmission (%) | water absorption at saturation (%) | ball drop test (g) | Rockwell hardness (M) | heat resistance (Tg, °C.) |
|---|---|---|---|---|---|---|---|---|
| example 19 | EA1 70 | 9BGDM 30 | — | 90 | 2.0 | 28 | 105 | 120 |
| example 20 | EA1 50 | 9BGDM 50 | — | 91 | 1.7 | 36 | 92 | 112 |
| example 21 | EA1 30 | 9BGDM 70 | — | 91 | 1.3 | 40 | 80 | 102 |
| example 22 | EA2 80 | 9BGDM 15 | MMA 5 | 90 | 1.1 | 30 | 102 | 115 |
| example 23 | EA2 60 | 9BGDA 30 | BP2EA 10 | 90 | 0.7 | 24 | 95 | 98 |
| example 24 | EA2 40 | 12BGDM 40 | HDDM 20 | 90 | 0.9 | 28 | 90 | 106 |
| example 25 | EA3 20 | 9BGDM 70 | TMPM 10 | 91 | 1.2 | 32 | 85 | 125 |
| example 26 | EA3 40 | 9BGDM 40 | HDDM 20 | 91 | 1.5 | 20 | 87 | 127 |
| comparative example 22 | — | — | MMA 100 | 92 | 2.2 | 10 | 90 | 80 |
| comparative example 23 | EA1 100 | — | — | 89 | 4.1 | 12 | 116 | 128 |
| comparative example 24 | EA2 80 | — | MMA 20 | 89 | 2.6 | 16 | 125 | 130 |
| comparative example 25 | EA2 40 | — | HDDM 60 | 89 | 1.7 | 6 | 105 | 135 |
| comparative example 26 | — | 9BGDM 70 | HDDM 30 | 91 | 1.1 | 32 | 40 | 58 |
| comparative example 27 | — | 9BGDM 30 | MMA 70 | 92 | 1.5 | 22 | 50 | 70 |
| comparative example 28 | EA1 5 | 9BGDM 95 | — | 91 | 1.1 | 100 | 52 | 65 |
| comparative example 29 | EA1 50 | [9EGDM] 50 | — | 90 | 6.2 | 36 | 82 | 105 |
| comparative example 30 | EA1 50 | [9 PGDM] 50 | — | 89 | 5.8 | 24 | 95 | 108 |
| comparative example 31 | EA1 50 | [14EGDM] 50 | — | 89 | 7.8 | 40 | 70 | 106 |

As mentioned above in detail, the polybutylene glycol dimethacrylate of the present invention provides various kinds of plastics having good flexibility and low water absorption. The resin composition for cast polymerization pertaining to the present invention provides molded products which have good flexibility and low absorption, without sacrificing heat resistance, impact resistance, and surface hardness. Therefore, they will find use as optical materials, lenses, optical discs, laminated glass, and film.

Having described a specific preferred example of the present invention, it is to be understood that the invention is not limited to that precise example, and that various changes and modifications may be effected therein by one skilled in the art without departing from the scope or spirit of the invention as defined in the appended claims.

What is claimed is:

1. A resin composition for cast polymerization which comprises
   (a) 10-90 parts by weight of at least one compound selected from the group consisting of epoxy poly(meth)acrylate having two or more (meth)acryloyloxy groups in one molecule and urethane poly(meth)-acrylate having two or more (meth)acryloyloxy groups in one molecule, said urethane poly(meth)-acrylate having been obtained by the reaction of a hydroxy group-containing (meth)acrylate with isophorone diisocyanate, trimer of hexamethylene diisocyanate, 2,2,4-trimethylhexamethylene diisocyanate, dicyclohexylmethane diisocyanate, 1,3-bis(α,α-dimethylisocyanatemethyl)benzene, xylylene diisocyanate, tetramethylene diisocyanate, dimer acid diisocyanate, cyclohexane diisocyanate, tolylene diisocyanate, diphenylmethane diisocyanate, m-phenylene diisocyanate, naphthalene diisocyanate or biphenyl diisocyanate, and
   (b) 10-90 parts by weight of polybutylene glycol di(meth)acrylate represented by the general formula below:

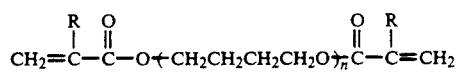

where R represents hydrogen or methyl and n is an integer of 5 to 16,
with the total amount of components (a) and (b) being 100 parts by weight.

2. A resin composition for cast polymerization as claimed in claim 1, wherein the urethane poly(meth)acrylate having two or more (meth)acryloyloxy groups in one molecule is an adduct of 2-hydroxyethyl (meth)acrylate or 2-hydroxypropyl (meth)acrylate with isophorone diisocyanate, trimer of hexamethylene diisocyanate, 2,2,4-trimethylhexamethylene diisocyanate, dicyclohexylmethane diisocyanate, 1,3-bis(α,α-dimethylisocyanatemethyl)benzene, or xylylene diisocyanate.

3. A resin composition for cast polymerization as claimed in claim 1, wherein the epoxy poly(meth)acrylate having two or more (meth)acryloyloxy groups in one molecule is a reaction product of acrylic acid or methacrylic acid with 1,6-hexanediol diglycidyl ether, diethylene glycol diglycidyl ether, trimethylolpropane diglycidyl ether, trimethylolpropane triglycidyl ether, glycerol diglycidyl ether, glycerol triglycidyl ether, triglycidyl of tris(2-hydroxyethyl)isocyanurate, 2,2-bis(4-glycidyloxycyclohexy)propane, bisphenol S diglycidyl ether, or tetrabromobisphenol A diglycidyl ether.

4. A resin composition for cast polymerization as claimed in claim 1, wherein the polybutylene glycol di(meth)acrylate is one member selected from the group consisting of heptabutylene glycol di(meth)acrylate, octabutylene glycol di(meth)acrylate, nonabutylene glycol di(meth)acrylate, decabutylene glycol di(meth)acrylate, undecabutylene glycol di(meth)acrylate, and dodecabutylene glycol di(meth)acrylate.

5. A resin composition for cast polymerization as claimed in claim 1, which further comprises a compound having at least one polymerizable double bond in the molecule.

6. A resin composition for cast polymerization as claimed in claim 5, wherein the compound having at least one polymerizable double bond in the molecule is at least one member selected from the group consisting of methyl methacrylate, styrene, n-butyl methacrylate, diethylene glycol dimethacrylate, and 1,6-hexamethylene dimethacrylate.

7. A resin composition for cast polymerization which comprises (a) 10–90 parts by weight of at least one epoxy poly(meth)acrylate having two or more (meth)acryloyloxy groups in one molecule, and (b) 10–90 parts by weight of polybutylene glycol di(meth)acrylate represented by the formula

where R represents hydrogen or methyl and n is an integer of 5 to 16,
with the total amount of components (a) and (b) being 100 parts by weight.

8. A resin composition for cast polymerization as claimed in claim 7, wherein the epoxy-poly(meth)acrylate having two or more (meth)acryloyloxy groups in one molecule is a reaction product of acrylic acid or methacrylic acid with 1,6-hexanediol diglycidyl ether, diethylene glycol diglycidyl ether, trimethylolpropane diglycidyl ether, trimethylolpropane triglycidyl ether, glycerol diglycidyl ether, glycerol triglycidyl ether, triglycidyl or tris tris(2-hydroxyethyl)isocyanurate, 2,2-bis(4-glycidyloxycyclohexyl) propane, bisphenol A diglycidyl ether, or tetrabromobisphenol A diglycidyl ether.

9. A resin composition for cast polymerization as claimed in claim 7, wherein the polybutylene glycol di(meth)acrylate is one member selected from the consisting of heptabutylene glycol di(meth)acrylate, octabutylene glycol di(meth)acrylate, nonabutylene glycol di(meth)acrylate, decabutylene glycol di(meth)acrylate, undecabutylene glycol di(meth)acrylate, and dodecabutylene glycol di(meth)acrylate.

10. A resin composition for cast polymerization as claimed in claim 7, which further comprises a compound having at least one polymerizable double bond in the molecule.

11. A resin composition for cast polymerization as claimed in claim 10, wherein the compound having at least one polymerizable double bond in the molecule is at least one member selected from the group consisting of methyl methacrylate, styrene, n-butyl methacrylate, diethylene glycol dimethacrylate and 1,6-hexamethylene dimethacrylate.

12. A resin composition for cast polymerization which comprises (a) 10–90 parts by weight of at least one urethane poly(meth)acrylate having two or more (meth)acryloyloxy groups in one molecule obtained by the reaction of a hydroxy group-containing (meth)acrylate with isophorone diisocyanate, trimer of hexamethylene diisocyanate, 2,2,4-trimethylhexamethylene diisocyanate, dicyclohexylmethane diisocyanate, 1,3-bis(α,α-dimethylisocyanatemethyl)benzene, xylylene diisocyanate, tetramethylene diisocyanate, dimer acid diisocyanate, cyclohexane diisocyanate, tolylene diisocyanate, diphenylmethane diisocyanate, m-phenylene diisocyanate, naphthalene diisocyanate or biphenyl diisocyanate, and (b) 10–90 parts by weight of polybutylene glycol di(meth)acrylate represented by the general formula below

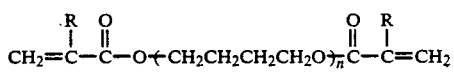

where R represents hydrogen or methyl and n is an integer of 5 to 16,
with the total amount of components (a) and (b) being 100 parts by weight.

13. A resin composition for cast polymerization as claimed in claim 12, wherein the urethane poly(meth)acrylate having two or more (meth)acryloyloxy groups in one molecule is an adduct of 2-hydroxyethyl (meth)acrylate or 2-hydroxypropyl (meth)acrylate with isophorone diisocyanate, trimer of hexamethylene diisocyanate, 2,2,4-trimethylhexamethylene diisocyanate, dicyclohexylmethane diisocyanate, 1,3-bis(α,α-dimethylisocyanatemethyl)benzene, or xylylene diisocyanate.

14. A resin composition for cast polymerization as claimed in claim 12, wherein the polybutylene glycol di(meth)acrylate is one member selected from the consisting of heptabutylene glycol di(meth)acrylate, octabutylene glycol di(meth)acrylate, nonabutylene glycol di(meth)acrylate, decabutylene glycol di(meth)acrylate, undecabutylene glycol di(meth)acrylate and dodecabutylene glycol di(meth)acrylate.

15. A resin composition for cast polymerization as claimed in claim 12, which further comprises a compound having at least one polymerizable double bond in the molecule.

16. A resin composition for cast polymerization as claimed in claim 15, wherein the compound having at least one polymerizable double bond in the molecule is at least one member selected from the group consisting of methyl methacrylate, styrene, n-butyl methacrylate, diethylene glycol dimethacrylate, and 1,6-hexamethylene dimethacrylate.

* * * * *